Aug. 24, 1926.
J. H. WAGENHORST
1,597,226
METHOD OF MANUFACTURING WHEELS
Original Filed Feb. 19, 1920
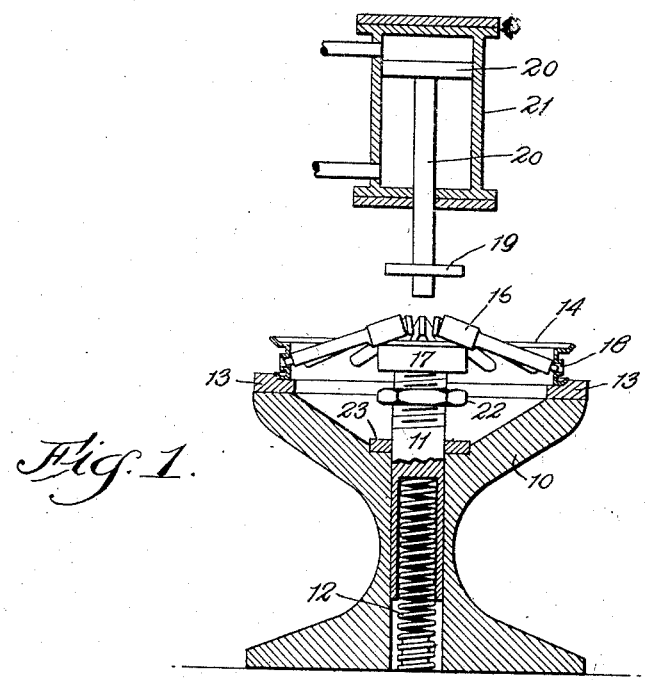
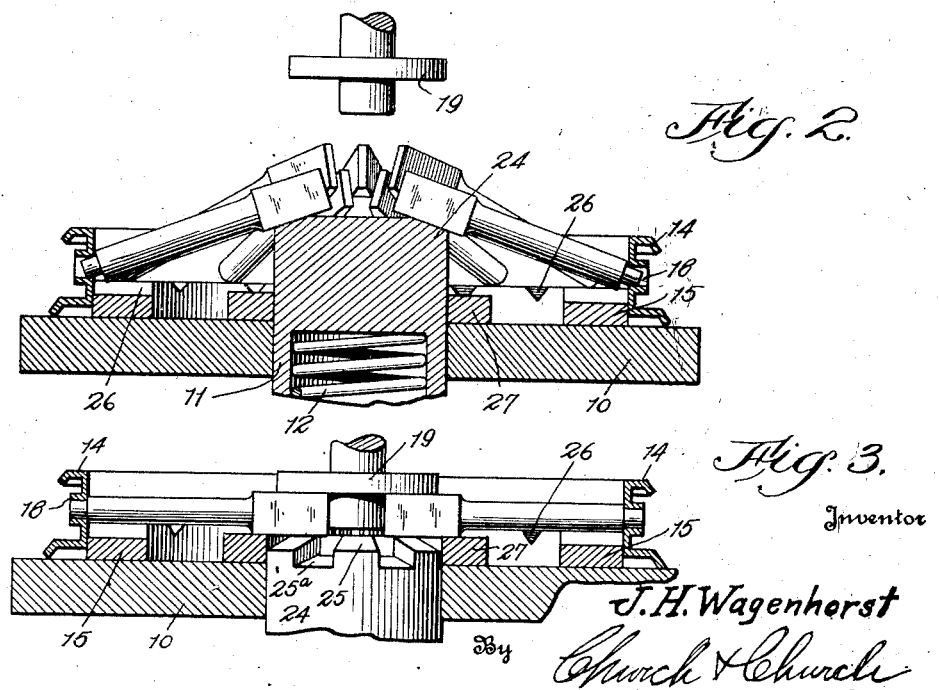

Patented Aug. 24, 1926.

1,597,226

UNITED STATES PATENT OFFICE.

JAMES H. WAGENHORST, OF JACKSON, MICHIGAN.

METHOD OF MANUFACTURING WHEELS.

Original application filed February 19, 1920, Serial No. 359,936. Divided and this application filed February 17, 1926. Serial No. 88,845.

My invention relates to an improved method of manufacturing wheels and has to do more particularly with the manufacture of wooden spoked wheels having metal fellies or fixed rims. The principal object of my invention is to provide an improved and simplified method of assembling a set of spokes within the steel felly or fixed rim, in such way as to avoid, as much as possible, the mashing or injuring of the edges of the inner, mitered spoke ends and so as to assemble the spokes within the fixed rim in such a way as to insure the correct radial positioning of the spokes with reference to the felly.

Further objects, and objects relating to details and economies of operation, will definitely appear from the detailed description following. In one instance, I accomplish the objects of my invention by the devices and means set forth in the following specification. My invention is clearly defined and pointed out in the appended claims.

My method is illustrated in the accompanying drawing forming a part of this specification, in which:

Fig. 1 is a sectional view through apparatus for assembling wheels illustrating, in general, a method of assembling the spokes within the fixed rim or felly;

Fig. 2 is a vertical sectional view through the apparatus, illustrating the method forming the subject matter of the present application; and Fig. 3 is a sectional view, corresponding to Fig. 2, but showing the spokes finally assembled within the fixed rim.

In general, my improved method consists in positioning the outer ends of a plurality of spokes in suitable sockets or recesses provided in the felly or fixed rim with the inner ends of said spokes supported at different distances above the plane of the outer ends, the inner ends of some of the spokes being elevated more than others, and then applying pressure to the sides of the butt ends of the more elevated spokes to move the entire spoke set into a common wheel plane and assemble the set of spokes in the fixed rim with their butt ends compressed together. I propose to support the inner ends of certain of the spokes somewhat elevated from the common wheel plane and to support alternate spokes with their butt ends slightly more elevated from the common wheel plane and to apply the pressure to the more elevated spokes, with the result of moving the entire spoke set downwardly and moving the butt ends of alternate spokes with reference to each other until the butt ends of all the spokes are brought into alinement and the entire spoke set is brought into the common wheel plane or into the position which the spokes assume when assembled in the wheel, ready for use.

Referring to the drawings, I have shown a supporting frame 10 which carries an annular ring 13 having a shoulder receiving and surrounding the metal fixed rim or felly 14 within which the spokes 16 are to be assembled. This felly is provided with sockets 18 to receive the spoke tenons and, in the method illustrated in Fig. 1, the spokes are positioned on the head 17 of a depressible support 11, with the tenons at the outer ends of the spokes, positioned in the sockets 18. The depressible support 11 is spring-pressed upwardly by the spring 12 and normally occupies a position such that the inner or butt ends of the spokes 16 are supported above the wheel plane, that is, above the plane containing the outer ends of the spokes and representing the position which the spokes assume when they are assembled in the wheel. Having loosely positioned the spokes, as thus indicated, pressure is applied to the ram 19 by the piston 20 operating in the fluid pressure cylinder 21. The ram 19 engages the butt ends of the spokes resting on the head 17 of the depressible support and presses the butt ends downwardly with the support against the pressure of the spring 12, thus crowding the butt ends of the spokes together and bringing the spokes into the common wheel plane.

It will be noted that, according to the method just described, pressure is applied by the ram 19 to the butt ends of all the spokes of the set and there is a possibility of crushing or mashing the edges of the mitered ends of these spokes. My present invention relates to an improvement upon this method, illustrated more particularly in Fig. 2, in which the head 24 of the depressible support 11 is provided with radial notches 25ª with raised inclined portions 25 between the notches. Every alternate spoke has its inner end resting in one of said notches, while the other spokes rest upon the raised portions 25 between the notches, with the result that part of the spokes of the set are supported at a greater elevation above the common wheel plane than the other spokes of the set. The ring 15 is mounted on the table or frame 10 and fits inside of the steel felly 14, serving to prevent the distortion of the felly and preserving its concentricity. As the ram 19 descends, it engages the edges of the inner mitered ends of the spokes which are more elevated and, pressing upon these spokes, forces the support 11 downward against the pressure of the spring 12 until the other spokes of the set engage the fixed ring 27. The movement up to this point has brought the spokes practically into the common wheel plane except for the staggering of adjacent spokes with reference to each other, due to the manner in which they were initially supported. After the lowermost spokes have engaged the ring 27, the ram 19 acts on the uppermost spokes to force them into alinement with the other spokes, thus bringing all the spokes of the set into alinement in a common wheel plane. It will be observed that the ram 19 engages only part of the spokes of the set and, therefore, the danger of crushing or mashing the edges of the spokes during assembly is lessened. Furthermore, this makes more certain the correct radial positioning of the spokes within the felly, inasmuch as notches 25$^a$ in the head 24 of the depressible support 11 serve to maintain the inner ends of the spokes in proper radial position until just before the final squeezing action which brings the staggered butt ends into alinement. Furthermore, the ring 15 has radial guide notches 26 formed therein which are engaged by the outer ends of the spokes and assist the notches 25$^a$ in maintaining the correct radial positioning of the spokes during the assembling operation.

The staggering of the butt ends of the spokes and the supporting of some of them at a greater elevation from the common wheel plane than others has this decided advantage in that the butt ends of the spokes can be brought closer to the common wheel plane before the crushing action begins to take place, with the result that practically all of this crushing tendency is confined to the latter part of the stroke of the ram 19 when it is acting to squeeze the butt ends of the spokes into axial alinement.

This application is a division of my copending application Serial No. 359,936, filed February 19, 1920.

Having thus described my invention, what I claim as new and useful and desire to secure by Letters Patent is:

1. The method of making a wheel embodying a felly and a series of spokes, which comprises positioning the spokes radially with their outer ends in circumferentially spaced relation relative to the felly and alternately of greater and less inclination relative to the central plane of the felly, and operating against the inner ends of the spokes of greatest inclination to force the spokes toward the central plane of the felly.

2. The method of making wheels embodying a felly and a series of spokes having mitered ends of rectangular cross sections which comprises arranging the spokes with their outer ends in circumferentially spaced relation within a felly and with the inner ends of said spokes at varying heights relative to said felly, and forcing said spoke ends toward the plane of the felly.

3. The method of making wheels comprising the positioning of a set of spokes with their outer ends inserted in sockets in a wheel felly and their inner ends displaced laterally at varying distances from the central plane of the felly, pressing the inner ends of the spokes of the set laterally into the wheel plane, and then squeezing the inner ends of the spokes into alinement with each other.

4. The method of making wheels comprising the positioning of a set of spokes with their outer ends inserted in sockets in a wheel felly and their inner ends displaced laterally, the inner ends of alternate spokes being displaced at a greater distance from the central plane of the felly than intermediate spokes, pressing the inner ends of the spokes having the greatest lateral displacement in the direction of the axis of the felly to carry the spoke set into the wheel plane, and then squeezing the inner ends of the spokes together to bring them into alinement with each other.

5. The method of making wheels comprising the positioning of a set of spokes with their outer ends inserted in sockets in a wheel felly and the inner ends of certain of the spokes displaced laterally at varying distances from the central plane of the felly, and applying pressure in the direction of the axis of the felly to the inner ends of the spokes having greatest displacement to bring the set of spokes into alinement in the wheel plane.

JAMES H. WAGENHORST.